Jan. 14, 1930. H. NIELSEN ET AL 1,743,930
PROCESS OF MAKING PRODUCER GAS
Filed Aug. 9, 1924 2 Sheets-Sheet 2
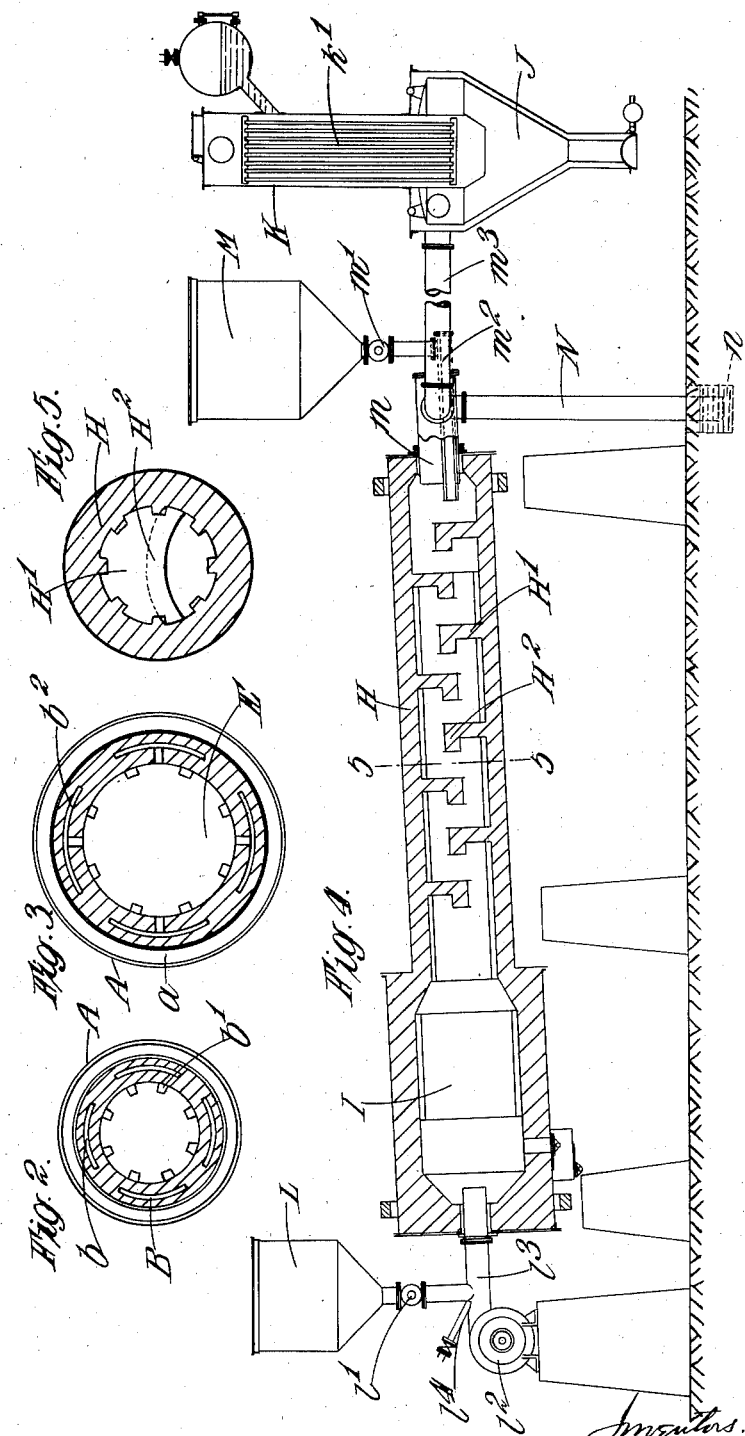

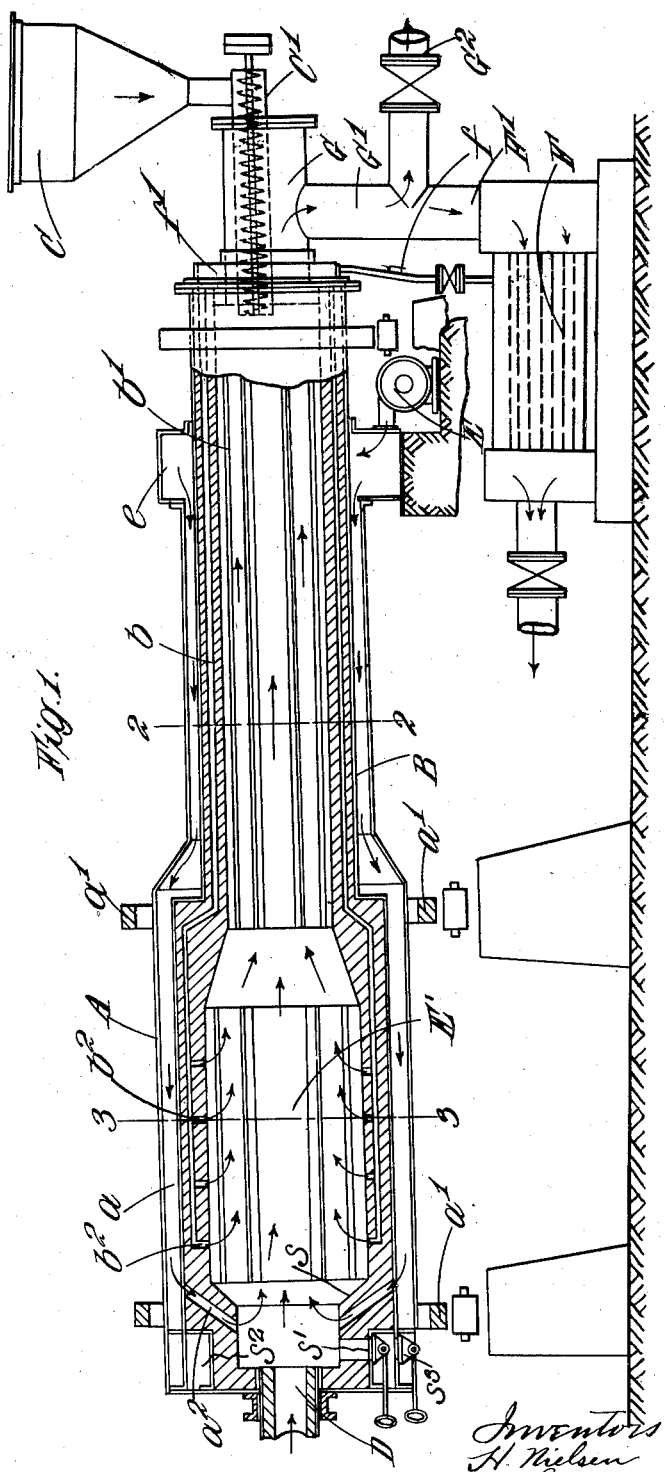

Patented Jan. 14, 1930

1,743,930

UNITED STATES PATENT OFFICE

HARALD NIELSEN, OF MUSWELL HILL, LONDON, AND BRYAN LAING, OF HATFIELD, ENGLAND

PROCESS OF MAKING PRODUCER GAS

Application filed August 9, 1924, Serial No. 731,227, and in Great Britain August 17, 1923.

This invention relates to the process of making producer gas by the gasification, distillation or treatment of carbonaceous and other materials, the chief object of the invention being to manufacture producer gas from powdered, dusty or pulverized carbonaceous materials such as coal, lignite, peat, wood or sawdust and the like; other objects are to effect the reduction of ores or to treat sewage with the object of recovering the valuable volatilizable constituents contained therein.

During the manufacture of ordinary producer gas, as is well understood, an incandescent fuel bed is maintained through which a so-called blast, that is to say, an air or steam mixture, passes.

The resultant reaction between the free carbon and the so-called combined oxygen (e. g. $H_2O$ or $CO_2$) being endothermic, any deficiency in heat is made good by oxidizing or completely combusting part of the carbon into $CO_2$, and to this end and by means of an air blast the carbon is first converted into $CO_2$ by reacting with the oxygen; the $CO_2$, or a part of the same corresponding to the so-called reaction equilibrium in the fuel bed, being thereafter reduced by the incandescent carbon to CO.

The various reactions can be successfully carried on if a suitable fuel in an appropriate form is employed, that is to say, a fuel which does not contain a large percentage of dust or "smalls" (small pieces of coal about the size of a hazel nut or pea), as the latter tend to block up the passageways for the blast and the resulting gases; on account of this fact a large proportion of suitable fuels, such as coal which is in the form of dust and smalls, can be utilized only to a limited extent in ordinary producers.

According to the present invention a gaseous medium is passed through or brought into contact with the material to be treated, said medium being under sufficient pressure, or having sufficient speed to penetrate or agitate the material and if desired, being also adapted to heat the material to the desired reaction temperature. To this end the necessary oxygen in the form of free air, or steam, or a mixture thereof, is caused to enter at one end of a suitable apparatus and to carry with it sufficient powdered fuel to maintain the desired reaction temperature, the fuel being completely combusted into $CO_2$ or to any required extent, so that any requisite temperature is obtained, whilst at the opposite end of the apparatus, the balance of the fuel, that is to say the reducing fuel, is caused to enter in a powdered or more or less finely divided state and to travel forward in counter-current to the hot gases, so that, as coking proceeds and the fuel becomes less and less active, higher temperatures are provided for the necessary reaction. This method may be carried on, for example, in an apparatus of somewhat similar construction to a rotary kiln of the kind usually employed for roasting or calcining cement or ores, the blast, which carries with it the powdered fuel employed to sustain the combustion temperature, being admitted at one end of the gas producer and the reducing fuel being fed in at the opposite end gas producer. Owing to this arrangement and as the fuel travels forward to meet the combustion gases, gradually increasing temperatures are reached and the fuel enters progressively hotter and still hotter zones, thus compensating continuously for more sluggish activity. The gas producer may be provided with shelves or the like in order to pick up the fuel, and allow the same to fall through the hot gases continuously until the reaction is completed and only ashes in a fused state remain. Owing to the long duration of contact obtained in this manner, the various reactions take place in the most suitable temperature zones, and, furthermore, as the gases are not required to carry the fuel forward by their velocity their speed need not be high, consequently very little unconsumed carbon or dust will be carried forward through the condensing plant or other apparatus through which the gases may eventually pass.

The gas producer or the lining thereof may be provided with channels or tubular passages through which the blast, or the steam and air mixture, may pass in order to preheat the same to any desired temperature before entering the combustion zone. Alternatively, the gas producer may be provided with an annular jacket which may serve the same purpose, or the steam and air mixture may be preheated, either together or separately. The blast may enter the gas producer at one end thereof or be blown in radially or otherwise through passages in the walls.

In order that the said invention may be clearly understood and readily carried into effect the same will now be described more fully with reference to the accompanying drawing, in which: —

Figure 1 is a part sectional elevation of a gas producer adapted to carry out the process of the present invention.

Figure 2 is a section on the line 2—2 of Figure 1.

Figure 3 is a section on the line 3—3 of Figure 1.

Figure 4 is a longitudinal section of a modified type of producer.

Figure 5 is a section on the line 5—5 of Figure 4.

Referring to Figures 1 to 3, A is the body of the gas producer. B is the fire brick lining thereof, and $a$ is a space left between the outer wall of the producer and the inner lining B through which the air is adapted to pass so that it may become preheated before entering the producer. $b$ are passages formed in the refractory inner lining through which steam is caused to pass so that it may also become superheated before entering the producer through the inlets $b^2$. The producer is inclined from the inlet to the outlet end thereof and is provided as usual with runner bands $a'$, $a'$, and any usual form of driving mechanism is provided so that a continuous rotary motion can be imparted to it. C is a hopper which contains the supply of powdered reducing fuel which is to undergo treatment within the gas producer and C' is a screw conveyor for conveying the material into the interior of the producer. $b'$ are shelves or projections disposed around the inner wall of the producer so as to assist in lifting and showering the powdered material as it passes from the inlet to the outlet end of the producer. D is the opening at the opposite end of the producer through which the supply of powdered fuel which is to be combusted is entered, the said material being blown in by means of a blower or otherwise. E is a fan or blower which causes a supply of air to enter the annular chamber $e$ and thereafter to pass along the space $a$ between the inner and outer walls of the producer and to enter through passages $a^2$ the enlarged compartment E' at one end thereof within which combustion of the powdered fuel takes place. F is a waste heat boiler heated by part of the gases generated from the carbonaceous materials undergoing treatment within the retort and $f$ is a steam pipe for leading off a quantity of the steam from the boiler F to an annular chamber $f'$ from which steam passes, through the passages $b$, $b$, and enters the gas producer through the inlets $b^2$, $b^2$. The gases leave the gas producer through a passage G disposed concentrically with the casing which contains the conveyor C'.

The ash passes up the inclined surface S and when the valve S' is opened it enters an annular space $S^2$ from which it is discharged periodically through a valve $S^3$. It will be understood that the valves S' and $S^3$ are to be operated alternately so as to prevent air entering the retort during the discharge of the ash therefrom.

In operation a supply of powdered fuel is blown in through the opening D and combustion takes place within the enlarged part E' of the gas producer, a suitable volume of air being admitted for the purpose of promoting combustion. Steam may also be admitted at the same time in order to control the temperature of the combustion and to be subsequently dissociated into $H_2$ and $O_2$ by the hot carbon. The products of combustion are carried forward towards the front end of the producer through which a supply of the powdered fuel is continuously being fed from the hopper C. As the powdered fuel travels forward to meet the combustion gases gradually increasing temperatures are reached and the fuel enters progressively hotter and still hotter zones. A long duration of contact is thus obtained and various reactions take place in the most suitable temperature zones. As the combustion gases are not required to carry the fuel forward by their velocity their speed need not be high. Consequently, very little unconsumed carbon or dust will be carried forward through the condensing plant through which the gases also eventually pass. If desired, however, a dust extractor can be provided and located at the point G' so as to extract dust from the gases before a portion thereof enters the main $G^2$ leading to the condensers, and the like, and the main F' leading to the waste heat boiler F.

In the modified arrangement shown at Figures 4 and 5, H is the body of the inclined retort, the upper end of which is provided with projecting baffles one of which is indicated at H', each having at its extremity a curved shelf $H^2$ which serves to lift up and shower the material during the continuous rotation of the producer. I is the enlarged chamber at one end of the gas producer within which combustion of the powdered fuel takes place. J is the dust extractor through which the gases pass before entering the flues $k'$, of the waste heat boiler K. As shown, the boiler K has indirect heat exchange, the gas passing therefrom through an outlet at the upper end. In this instance the supply of powdered fuel which is to be consumed at one end of the producer is contained within a hopper L and is fed through a rotary valve $l'$ into a passage $l^3$ where by means of a blower $l^2$ it is blown into the enlarged part I of the producer together with the requisite supply of air. $l^4$ is a steam pipe by which a suitable volume of steam taken from the boiler K can be mingled with the air and powdered fuel which enter the chamber I. The operation of this embodiment of the appartus is similar to that described with reference to Figures 1 to 3, the main supply of powdered fuel entering the gas producer from a hopper M through a rotary valve $m'$ into a conduit $m^2$ and from thence into the producer. $m$ is a tube disposed around the entrance conduit $m^2$ through which the gases leave the producer, said gases thereafter passing off laterally through the pipe $m^3$ to the dust extractor J. N is a pipe which in conjunction with the water seal $n$ acts as a safety device for releasing any excess pressure which may be caused by accidental explosions.

The aforesaid process and apparatus is also applicable to the treatment of other materials, for example to the reduction of ores, and the treatment of sewage with recovery of the volatil constituents contained therein. In the case of ores, the ore which is to be reduced such as iron oxide is introduced together with a quantity of powdered carbonaceous material to one end of the retort by means of a conveyor or otherwise where it meets the stream of combustion gases entering at the other end of the retort and produced by the combustion of powdered fuel and air or steam in the manner previously described. In the case of sewage the material to be treated, after being dried and reduced if necessary to powdered form, may be introduced at one end of the retort where as before the material during its passage through the retort will meet the stream of hot gases generated by the combustion of the powdered fuel at the other end of the retort. The volatile constituents yielded up can be collected and condensed in a similar manner to that effected in the case of other carbonaceous materials and the carbon and ash residue withdrawn from the retort as previously described.

What we claim and desire to secure by Letters Patent of the United States is:—

1. A process of making producer gas, which consists in continuously introducing powdered solid carbonaceous material and admixed air longitudinally at one end of a gas producer with sufficient speed to keep the solid particles in suspension, combusting said powdered material and air, introducing a controlled volume of superheated steam into a combustion zone at a plurality of points along the length of the gas producer, and continuously moving solid carbonaceous material longitudinally forward into the combustion zone from the opposite end of the gas producer, so as to gasify said last mentioned carbonaceous material.

2. A process of making producer gas, which consists in continuously introducing powdered solid carbonaceous material and admixed air longitudinally at one end of a gas producer with sufficient speed to keep the solid particles in suspension, combusting said powdered material and air, introducing a controlled volume of superheated steam into the combustion zone at a plurality of points along the length of the gas producer, continuously moving solid carbonaceous material longitudinally forward into the combustion zone from the opposite end of the gas producer, so as to gasify said last mentioned carbonaceous material, and removing the ash at that end of the gas producer where combustion takes place.

HARALD NIELSEN.
BRYAN LAING.